(No Model.)
J. E. TREAT.
PNEUMATIC CASH CARRIER.
No. 367,769. Patented Aug. 2, 1887.
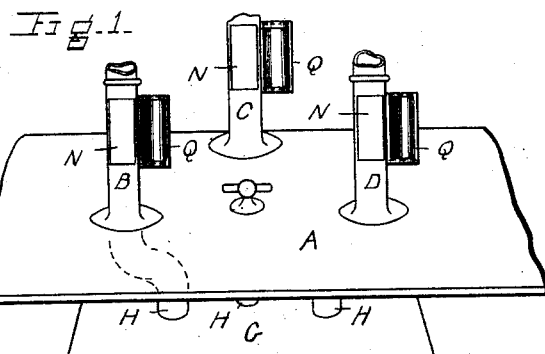
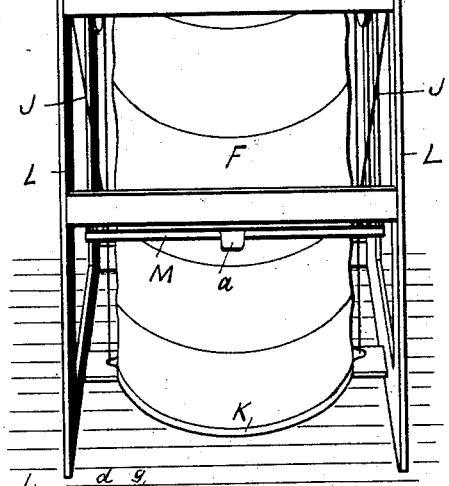
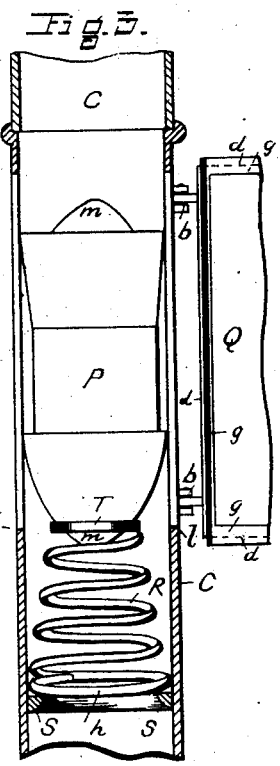
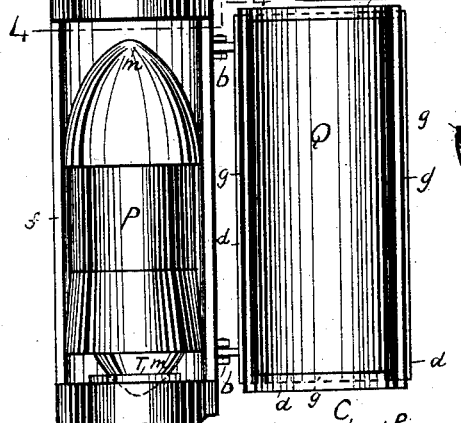
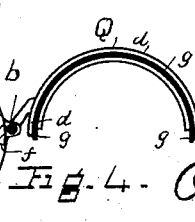
Witnesses
Percy Bryant
Inventor
James E. Treat
Edwin W. Brown
Attorney

UNITED STATES PATENT OFFICE.

JAMES E. TREAT, OF BOSTON, MASSACHUSETTS.

PNEUMATIC CASH-CARRIER.

SPECIFICATION forming part of Letters Patent No. 367,769, dated August 2, 1887.

Application filed October 28, 1886. Serial No. 217,443. (No model.)

*To all whom it may concern:*

Be it known that I, JAMES E. TREAT, of Boston, in the county of Suffolk and State of Massachusetts, have invented certain new and useful Improvements in Pneumatic Cash-Carriers, of which the following is a full, clear, and exact description.

This invention relates to improvements in apparatus for pneumatic cash-carriers—such, for instance, as are described and shown in Letters Patent of the United States, dated December 29, 1885, No. 333,397; and the invention consists of a pneumatic tube for a pneumatic cash-carrier having an opening in its side at or near its end at the station, which opening is adapted to be closed by a door, &c., by which the carrier can be inserted in the tube and removed therefrom for the purposes for which the apparatus is used; and the invention also consists of a pneumatic tube for a pneumatic cash-carrier apparatus having an elastic cushion or spring secured therein to receive the carrier after its transmission through the tube, all substantially as hereinafter fully described.

In the accompanying plate of drawings is illustrated the present invention as applied to pneumatic tubes in a pneumatic cash-carrier apparatus constructed for operation substantially in accordance with the invention described in said Letters Patent.

Figure 1 is a perspective view of the cashier's desk or table or central station of a pneumatic cash-carrier apparatus; Fig. 2, a detail front view of the pneumatic tube at the opening at which the carrier is inserted and removed, with a carrier therein in side view; Fig. 3, a vertical longitudinal section of the tube at such opening; Fig. 4, a cross-section on line 4 4, Fig. 2, the carrier being removed; and Fig. 5, a cross-section of the tube through the opening, with the door closed, Figs. 2, 3, 4, and 5 being enlarged.

In the drawings, A represents a cashier's desk or table or central station, from which the three pneumatic tubes B, C, and D lead to their respective sales counters or stations, (not shown in the drawings,) each tube being secured to the table-top A.

F is the bellows secured to the board G below the table-top, and each tube has communication therewith by a separate pipe, H, secured to the bellows board G and the table-board A. Cords J are attached to the bottom board, K, of the bellows and to the side uprights, L, of the board G, one each side, which respectively extend around the pulleys on the side uprights and pulleys on a treadle, M, the treadle being pivoted to the uprights and arranged to be operated at *a* at the front end of the table.

Suitable valves (not shown in the drawings) are arranged between the bellows and the tubes, whereby the tubes can be closed as to their air communication with the bellows as desired.

Pressing down the treadle closes the bellows, forcing air into the tube in communication therewith, causing the carrier, if placed therein, to travel through said tube to its sales counter or station, all substantially as described in said patent, and needing no more particular description herein, except so far as relates to the present invention.

In the front of each tube B, C, and D is an opening, N, large enough for the carrier P to pass through and to be placed in or removed from the tube. This opening N has a door, Q, of the same shape in cross-section as the tube, and hinged at *b* at one side of the opening, and arranged to cover said opening when closed, the door having flanges *d* around its edges to project a short distance beyond the edges *f* of the opening, to lie against the side of the tube, which flanges are preferably lined or covered with india-rubber, *g*, or any suitable elastic or yielding material, to insure, when the door is closed, an air-tight joint at the edges of the opening.

Within the tube is a spiral spring, R, resting by its lower end, *h*, on a flange or shoulder, S, on the inside of the tube, and having attached or secured to its upper end a ring, T, which, when the spring is in its normal position and at rest, is preferably about on a line with the bottom edge, *l*, of the opening, as shown in the drawings. The internal diameter of this ring T is such as to allow the pointed end *m* of the carrier to enter and project partially through the same, as shown in Figs. 2 and 3, and externally it is small enough, as well as the coils of the spring, for free movement of the same up and down in the tube when in operation.

With the carrier P in the tube, as shown in Fig. 2, ready for transmission therethrough, close the door Q and operate the bellows sufficiently to drive the carrier by the air-pressure therein through the tube to the station at the other end, where it is received by the spring R at such end, as shown in Fig. 3. The spring acts as a cushion, breaking more or less the force or momentum of the carrier, its reaction tending to throw the carrier out through the opening onto the table or sales-counter; or it can be removed by hand, when it can be opened, its contents removed, and others placed therein and returned through the tube, all as usual in such apparatus.

The door can be hinged or secured in any suitable manner for the opening and closing of the opening to the tube; also, the ring T can be dispensed with and the spring itself only used, its upper coil serving to receive the end of the carrier. A spring in the form of a spiral is very desirable, as it presents very little obstruction to the passage of air through the tube and can be easily made as elastic and free as desired.

An opening is arranged as described in each tube at each end, and the doors are always open, except the one at opening from which the carrier is transmitted, which is closed at such time to prevent air escaping therefrom between the bellows and the carrier when the apparatus is operated.

Having thus described my invention, what I claim is—

1. A pneumatic tube for a cash-carrier apparatus, having a spiral spring secured therein, substantially as and for the purpose specified.

2. A pneumatic tube for a cash-carrier apparatus, having a spiral spring secured therein and provided at its upper end with a ring, substantially as and for the purpose specified.

3. A pneumatic tube for a cash-carrier apparatus, having an opening at one side provided with a door and a spiral spring secured within said tube, substantially as and for the purpose specified.

In testimony whereof I have hereunto set my hand in the presence of two subscribing witnesses.

JAMES E. TREAT.

Witnesses:
EDWIN W. BROWN,
JOHN L. GIVEN.